United States Patent
Mutanen et al.

(10) Patent No.: US 7,324,114 B2
(45) Date of Patent: Jan. 29, 2008

(54) SYNCHRONIZATION OF IMAGE FRAME UPDATE

(75) Inventors: Mari Mutanen, Lempäälä (FI); Antti Hartikainen, Varkaus (FI); Timo Kaikumaa, Tampere (FI)

(73) Assignee: Nokia Corporation, Espoo (FI)

( * ) Notice: Subject to any disclaimer, the term of this patent is extended or adjusted under 35 U.S.C. 154(b) by 819 days.

(21) Appl. No.: 10/837,314

(22) Filed: Apr. 30, 2004

(65) Prior Publication Data

US 2004/0239677 A1 Dec. 2, 2004

(30) Foreign Application Priority Data

Apr. 30, 2003 (FI) ................... 20030656

(51) Int. Cl.
G09G 5/36 (2006.01)
G09G 5/00 (2006.01)

(52) U.S. Cl. ...................... 345/545; 345/204

(58) Field of Classification Search ............... 345/204, 345/531, 545, 547, 520
See application file for complete search history.

(56) References Cited

U.S. PATENT DOCUMENTS 5,019,906 A 5/1991 Wesolowski
5,446,496 A 8/1995 Bradly et al.
6,304,253 B1 10/2001 Sung
6,816,163 B2 * 11/2004 Antila ..................... 345/545

FOREIGN PATENT DOCUMENTS

EP 1 217 602 A2 6/2002
GB 2162356 A 1/1986

* cited by examiner

Primary Examiner—Jimmy H. Nguyen
(74) Attorney, Agent, or Firm—Hollingsworth & Funk, LLC

(57) ABSTRACT

A method of updating image frames to a display screen. A display system comprises a display screen, a frame memory for buffering the image frames prior to a transfer to the display screen, a display interface for receiving the image data into the frame memory, a separate controller for inputting the image data in the frame memory, and a display driver for controlling the display system. Image data are transferred by means of the separate controller to the display screen, after which a synchronization signal is fed back from the image frame updated to the display screen. A limiter register is used to specify a moment when image frame update in the frame memory is prevented. The separate controller is controlled to prevent image frame input in the frame memory as long as the counter value is within the limits of the limit value of the limiter register.

14 Claims, 4 Drawing Sheets

SYNCHRONIZATION OF IMAGE FRAME UPDATE

FIELD OF THE INVENTION

The invention relates to updating image frames on a display screen, particularly to synchronizing updating in connection with displays comprising a separate controller, such as a DMA controller.

BACKGROUND OF THE INVENTION

Display modules are used for instance in different computer systems and portable terminals, such as mobile stations, for displaying text and images to the user of the device. A display signal, typically comprising a display data signal and a synchronization signal, is input in a display screen comprised by the display module. A display data signal comprises image frames, which are distinguished from each other by means of a vertical synchronization signal comprised by the synchronization signal. The synchronization signal also comprises a horizontal synchronization signal for specifying the mutual separation of lines comprised by one image frame.

In conventional display systems, synchronization signals are typically incorporated into a display signal coming to the display module, whereas in newer display modules comprising a frame memory, synchronization signals are generated inside the display module. The frame memory is used for buffering image frames before the image frames are displayed on the display screen. Image frames are displayed to the user of the device by means of the display screen, the display screen receiving the image frames at a given rate. Image frames are updated to the display screen at a rate called the display refresh rate.

The problem here is that the update of a new image frame in the frame memory easily gets unsynchronized relative to the display refresh rate, which causes what is known as a tearing effect in the image displayed on the display screen, one part of the image displayed on the screen being composed of one image frame and another part being composed of another image frame. This is seen on the display screen as flickering lines or breaking in a laterally moving object. The tearing effect is generated because data comprised by a new image frame is stored in the frame memory before the corresponding data in the previous image frame is updated to the display screen.

The Applicant's previous patent application EP 1217602 discloses a method of avoiding tearing in a display unit. In the solution of publication EP 1217602, synchronization signals are connected to a control system from the display signal to be updated to the display screen, feedback synchronization signals being combined to form one signal, allowing the control system to interpret both synchronization signals correctly from one signal. The synchronization signals can be combined to form one signal by means of a logic OR or XOR operation, for example. The control system is timed on the basis of pulses comprised by the synchronization signals to input a new image frame in the frame buffer.

However, a drawback of this simple and thus advantageous solution is that the update of the following image frame in the buffer memory is controlled on the basis of a predetermined pulse, typically a vertical synchronization signal pulse. In this case, during the update of one image frame, there is only one moment that can trigger the update of a new image frame. In other words, if the application used presents an update request for a new image frame soon after the vertical synchronization signal pulse, the update of the image frame is initiated only from the following vertical synchronization signal pulse. Such a long delay in an image frame update causes harmful jerking in the image displayed on the display.

BRIEF DESCRIPTION OF THE INVENTION

The object of the invention is thus to provide an improved method and an apparatus for implementing the method for controlling image frame update. The objects of the invention are achieved by a method, system and mobile station that are characterized in what is stated in the independent claims.

Preferred embodiments of the invention are described in the dependent claims.

The invention is based on transferring image data in a display system by means of a separate controller, such as a DMA controller, to a display screen, the display system comprising a display screen for displaying image frames, a frame memory for buffering the image frames before the image frames are transferred to the display screen, a controller functionally connected to the frame memory for incorporating a synchronization signal into the image data, a display interface for receiving image data in the frame memory, a separate controller, such as a DMA controller for inputting the image data via the display interface in the frame memory, and a display driver for controlling the operation of the display system. Said synchronization signal is preferably fed back to a counter from the image frame updated to the display screen. In this case, in response to a request presented to the display driver for inputting an image frame in the frame memory, a limiter register is used to specify the moment when image frame update is prevented, and the current counter value is compared with an limit value of the limiter register, and said separate controller is controlled to prevent image frame input via the display interface in the frame memory as long as the counter value is within the limits of the limit value of the limiter register.

In accordance with a preferred embodiment of the invention, in response to the specification of the limit value of the limiter register, an attenuation signal outcoming from the display driver is activated for the moment when image frame update is prevented, after which the DMA controller is initialized. The DMA controller is then controlled by means of the attenuation signal so that input of image data via the display interface in the frame buffer is prevented as long as the attenuation signal is active.

In accordance with a second preferred embodiment of the invention, the DMA controller is initialized before the limit value of the limiter register is specified such that the DMA controller waits for a DMA transfer request. The DMA transfer request is then used to control the DMA controller such that inputting the DMA transfer request in the DMA controller is prevented until the counter value is within the limits of the limit value of the limiter register.

The advantage of the method and system of the invention is that a tearing effect is avoided and the timely update of the image frame on the display screen is ensured. A further advantage is that the delay of the DMA transfer is minimized, since in several cases the transfer can occur immediately in response to the request presented by the application, and if the counter value is within the limits of the limit value of the limiter register, the transfer may occur immediately after the limit value of the register expires, whereby there is no need to wait for the next vertical synchronization pulse. Another advantage is that the essential parts of the implementation of DMA control according to the invention by means of feedback of synchronization signals are very simple to implement as a hardware solution, the system load, i.e. the required processing power, remaining low. A still further advantage is that since the DMA transfer request is a control signal internal to the display system, the interruptions caused by external software do not affect the transmission of the control signal after the DMA controller is initialized for the next DMA transfer, whereby the interruptions do not cause problems in the synchronization of the DMA transfer and the display update.

BRIEF DESCRIPTION OF THE FIGURES

In the following, preferred embodiments of the invention will be described in detail with reference to the accompanying drawings, in which.

DETAILED DESCRIPTION OF THE INVENTION

The structure of a digital display system according to a preferred embodiment of the invention is described next with reference to FIG. 1, the display system preferably being arranged to be used in connection with a mobile station. However, the invention is not limited only to displays of mobile stations, but can be applied to any display unit, wherein the transfer of image data from a main memory to a display screen is controlled with a separate controller by means of a feedback synchronization signal. Furthermore, the invention will be next described by way of example based on a preferred embodiment such that the separate controller implementing the transfer of image data is a DMA controller. However, the invention is not limited only to DMA controlled display systems, but any corresponding controller can be used as the controller, such as the microprocessor or a graphics accelerator of the device. Thus, in the present context, the term DMA transfer should be understood broadly in view of the above.

Figure 1:
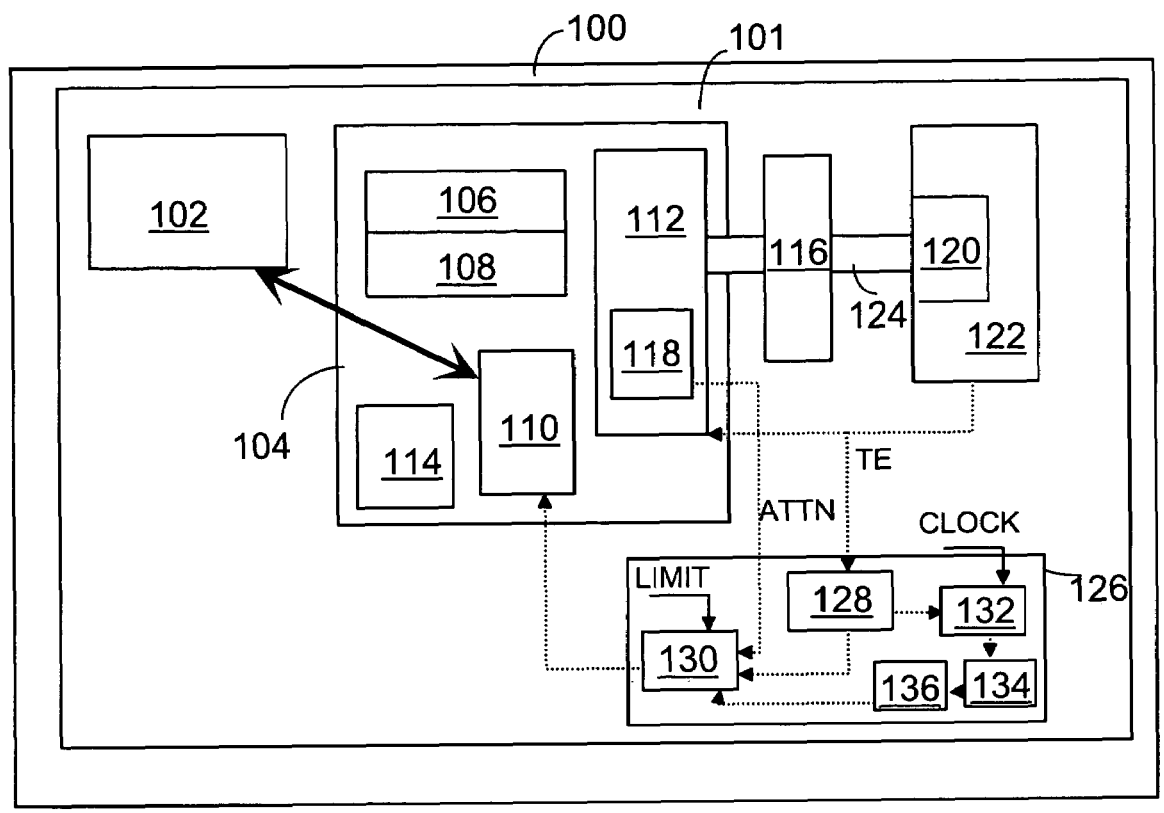
FIG. 1 is a block diagram of the structure of a display system according to a preferred embodiment of the invention.

In FIG. 1, a display system 101 integrated into a mobile station 100 comprises a main memory 102 for storing image frame information to be displayed and for inputting it further in a control system 104. The control system 104 comprises functionalities that are associated with editing the image frame information and can be implemented for instance as part of the functionalities of a master control unit (MCU) 106 and a digital signal processor (DSP) 108 of the mobile station. Updating image data from the memory 102 to a display interface 112 preferably takes place by means of a direct memory access, i.e. DMA controller 110, the DMA controller 110 retrieving the image frame information from the main memory 102 and transferring it directly to the display interface 112 without the master control unit 106 or the signal processor 108 issuing commands for transferring the image frame information. The master control unit 106 only initializes the DMA transfer and specifies, to the DMA controller 110, the image frame data to be transferred. Thus, the DMA controller inputs a data flow specifying image frames from the main memory 102 in the display interface 112. The control system 104 may also comprise a graphics accelerator 114 for adapting two- or three-dimensional graphics optimally suitable for the properties of the display system 101. As was stated above, instead of a DMA controller, the master control unit 106, the signal processor 108 or the graphics accelerator 114 can be used for transferring the image data.

The display system 101 further comprises a display driver 118, typically integrated into the display interface 112, and a buffer memory 116 for buffering image frames generated by application programs before the image frames are transferred to the display module. The display module comprises a frame memory 120 and a display screen 122 and, typically, a controller, implemented by software, for adding synchronization signals to the image data, the synchronization signals being used to control the update of an image frame to the display screen. The display system 101 further comprises a bus 124 for transferring the image frame information from the buffer memory 116 to the frame memory 120 of the display module. The display system 101 also comprises, preferably as a part of the display interface, a control block 126 for timely updating of the image frames to the display screen 122 in a manner avoiding the tearing effect. The control block 126 comprises at least a counter 128 and a DMA control circuit 130 for generating a control signal for the DMA controller 110. The control block 126 is also typically integrated into part of the display interface 112, but in this context it is described as a separate block to illustrate the invention. The control block 126 may, however, be implemented in some other part of the display system than in the display interface 112.

According to a further embodiment, in addition to the control block situated, for example, in the display interface 112, an additional hardware counter and two new registers may be included preferably in the control block for monitoring the actual display refresh rate and for holding the last measured display refresh frame rate. This embodiment is illustrated more in detail further below.

In a display system, in association with DMA controlled displays comprising memory, the image data to be transferred to a display interface do not comprise synchronization signals, only a display data signal. Only the image frame information to be input from the frame memory 120 in the display screen 122 comprises a display data signal and a synchronization signal. The display data signal comprises image frames that are distinguished from each other by means of a vertical synchronization signal comprised by the synchronization signal. In addition, the synchronization signal comprises a horizontal synchronization signal for specifying the mutual separation of the lines comprised by one image frame.

The pulse comprised by the vertical synchronization signal is transmitted after each image frame, whereby the vertical synchronization signal pulse indicates the start of the update of the next image frame to the display screen. The pulse comprised by the horizontal synchronization signal is transmitted after each line feed of the image frame, whereby the horizontal synchronization signal pulse indicates the start of the update of the next line of the image frame on the display screen.

These synchronization signals inside the display module are led from the display screen 122 by feedback to the display interface 112, allowing the display interface 112 to know when a new image frame is updated on the display. The display interface 112 uses an attenuation signal (ATTN) to control the DMA controller 110 to input image frames via the buffer memory 116, operating on the FIFO principle, to the frame memory 120. Once the buffer memory is full, the attenuation signal is set active. When image frame data are transferred from the buffer memory 116 to the frame memory 120, the attenuation signal is deactivated, allowing the DMA controller to input new image frame data in the buffer memory 116 or alternatively directly in the frame memory 120. In this case, if the internal refresh rate of the display deviates from the image frame data input rate, a tearing effect may be created.

To prevent a tearing effect from being generated on the display, in accordance with preferred embodiments of the invention, feedback display module synchronization signals are used to control the DMA controller such that the DMA controller does not transfer image data into the frame memory 120 before a sufficient time, as regards preventing a tearing effect, has passed from the update of the image frame data to the display screen. The operation of the DMA control circuit 130 comprised by the control block 126 of the invention is controlled by the counter 128, which is controlled by synchronization signal pulses, and by a limit value LIMIT, obtained from the transfer registers and specifying the moment when the transfer of image frame data to the display should be prevented in order to avoid a tearing effect. In a manner described below, the DMA control circuit 130 uses these input values to generate a control signal for controlling the operation of the DMA controller 110 in an advantageous manner.

The counter 128 can be controlled by the above described synchronization signals in various ways. The counter may be for instance a free-run counter that counts for instance 10 values for each display line to be updated or it may count individual lines of the display update. In the latter case, to obtain more accurate control, it may be preferable to also use an extra high resolution counter to still more accurately specify the moment when the DMA control circuit 130 is to generate the control signal. Furthermore, the synchronization signals may be vertical and horizontal synchronization signals as described above, but to implement the invention, any other synchronization signal may be used, for instance the rising edge of a synchronization pulse specifying the refresh rate. It should also be noted that the implementation of the invention is not subject to the use of a buffer memory 116, but in a practical implementation, the buffer memory can be used to preferably control the input of image data in the frame memory of the display module.

In accordance with a first preferred embodiment of the invention, the control block 126 is used for keeping the attenuation signal ATTN to be applied to the DMA controller 110 active long enough to prevent a tearing effect from being generated, after which the attenuation signal is deactivated, in response to which the DMA controller 110 starts to input image data in the frame memory 120. The moment when the attenuation signal ATTN is kept active is determined on the basis of the limit value LIMIT. The LIMIT value used at each particular time is determined on the basis of the values of the transfer register associated with the transfer of image data in such a manner that the relation of the refresh rate inside the display to the input rate of image frame data and the number of image frame lines to be updated at each particular time are taken into account.

A lower limit and an upper limit are specified for the LIMIT value, whereby DMA transfer is to be prevented when image frames are updated in the area defined by the limits. Two different transfer registers can be preferably used for specifying the upper limit and the lower limit. The update of image frame data on the display screen 122 is monitored from the display module on the basis of the feedback synchronization signals, which control the counter 128. The vertical synchronization signal pulse starts the counter 128, which preferably counts horizontal synchronization signal pulses, i.e. the update of the display lines, whereby the attenuation signal ATTN is set active in the DMA control circuit 130 when the counter reaches the lower limit of the LIMIT value. When the counter reaches the upper limit of the LIMIT value, the attenuation signal ATTN is deactivated, allowing the DMA controller 110 to start DMA transfer.

Figure 2:
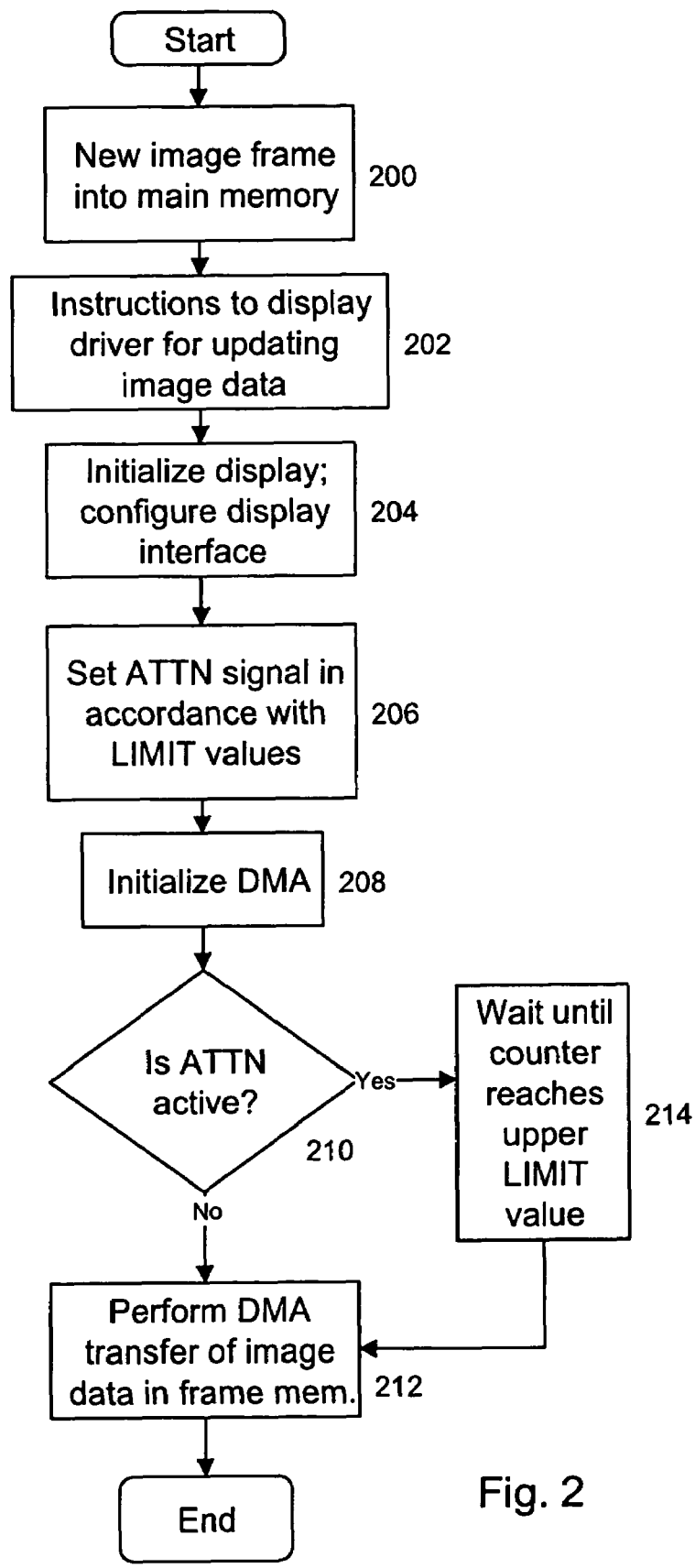
FIG. 2 is a flow diagram of a method of controlling DMA transfer according to a preferred embodiment of the invention.

In the following, this embodiment of the invention is illustrated by means of examples. In the first example, illustrated by the flow diagram of FIG. 2, the assumption is that the display screen fits 200 lines, the display refresh rate is twice the DMA transfer rate and new image data is to be updated to the display on lines 1 to 50. In this case, DMA transfer cannot be started during the time the previous image frame is updated to the display screen on lines 151 to 200. The image data is updated to the display screen as follows: an application displaying video image generates a new image frame in the main memory 102 (step 200), whereby the master control unit MCU 106 gives instructions to the display driver 118 regarding the area of the display where image data is to be transferred (step 202), in this case lines 1 to 50. The display driver 118 initializes the display for transfer of the next image data and configures the display interface 112 (step 204), and sets the value of the LIMIT register, whereby the attenuation signal ATTN input by the DMA control circuit 130 is also set in accordance with the LIMIT values (step 206). The display driver 118 then initializes the DMA controller 110 (step 208).

The lower limit and the upper limit of the LIMIT value are defined by taking into account the relation of the refresh rate inside the display to the image frame data input rate, and the number of image frame lines to be updated to the display at each particular time. In this case, as the update of the image frame proceeds on lines 1 to 150 on the display screen, the attenuation signal ATTN is deactivated, and, correspondingly, as the image frame update proceeds on lines 151 to 200 on the display screen, the attenuation signal ATTN is activated. Now, depending on the stage at which the update of the previous image frame proceeds on the display screen at the time the DMA transfer of the next image data into the frame memory on lines 1 to 50 is to be started (step 210), the following occurs:

if the request to start DMA transfer is presented as the image data update proceeds on lines 1 to 150 on the display, the attenuation signal ATTN is deactivated, and the DMA transfer of image frame data into the frame memory 120 can occur immediately (step 212);

if again the request to start DMA transfer is presented as the image data update proceeds on lines 151 to 200 of the display, the attenuation signal ATTN is activated and the start of the DMA transfer is delayed until the image data update moves to line 1 of the display, whereby the attenuation signal ATTN is again deactivated (step 214).

In the second example, the basis is otherwise the same as in the first example; the display comprises 200 lines and new image data is to be updated on lines 1 to 50 on the display, but the assumption here is that the display refresh rate is only half of the DMA transfer rate. In this case, the DMA transfer cannot be started during the time the previous image frame is updated to the display screen on lines 1 to 25. Herein, the process is otherwise the same as was described above, but as the image frame update proceeds on lines 26 to 200 on the display screen, the attenuation signal ATTN is deactivated and, similarly, as the image frame update proceeds on lines 1 to 25 on the display screen, the attenuation signal ATTN is activated. Again, depending on the stage at which the update of the previous image frame proceeds on the display screen at the time when the DMA transfer of the next image data into the frame memory on lines 1 to 50 is to be started, the following occurs:

if the request to start DMA transfer is presented as the image data update proceeds on lines 26 to 200 of the display, the attenuation signal ATTN is deactivated, and the DMA transfer of image frame data into the frame memory 120 can occur immediately;

if again the request to start DMA transfer is presented as the image data update proceeds on lines 1 to 25 of the display, the attenuation signal ATTN is activated and the start of the DMA transfer is delayed until the image data update moves to line 26 of the display, whereby the attenuation signal ATTN is again deactivated.

The above examples illustrate well the advantages achieved by the invention. In most cases, when the application requests image data update, DMA transfer can be started immediately, and there is no need to wait for the only image frame-specific update triggering moment specified by the synchronization signals. Also when the start of the DMA transfer is delayed until the attenuation signal ATTN is again deactivated, the delay of the start of the DMA transfer is minimized to the shortest possible as regards the practical implementation. In prior art, the only image frame-specific update triggering moment specified by the synchronization signals would have to be waited for in this case, too.

In accordance with a second preferred embodiment of the invention, the control block 126 is used for delaying the DMA transfer request to be transmitted to the DMA controller 110 for a time to prevent a tearing effect from being generated. This embodiment, too, utilizes the lower and upper limits of the LIMIT value as defined above, and the counter 128 controlled by the feedback synchronization signal. A lower limit and an upper limit are specified for the LIMIT value in accordance with the display lines, whereby DMA transfer has to be prevented when image frame data is updated to the screen between these lines, which is accomplished by delaying the DMA transfer request until the image frame data update reaches the specified upper limit. The update of the image frames on the display screen 122 is observed on the basis of the feedback synchronization signals that control the counter 128. The vertical synchronization signal pulse starts the counter 128, and the transmission of the DMA transfer request to the DMA controller is prevented when the counter reaches the lower limit of the LIMIT value up to the moment when the counter reaches the upper limit of the LIMIT value.

Figure 3:
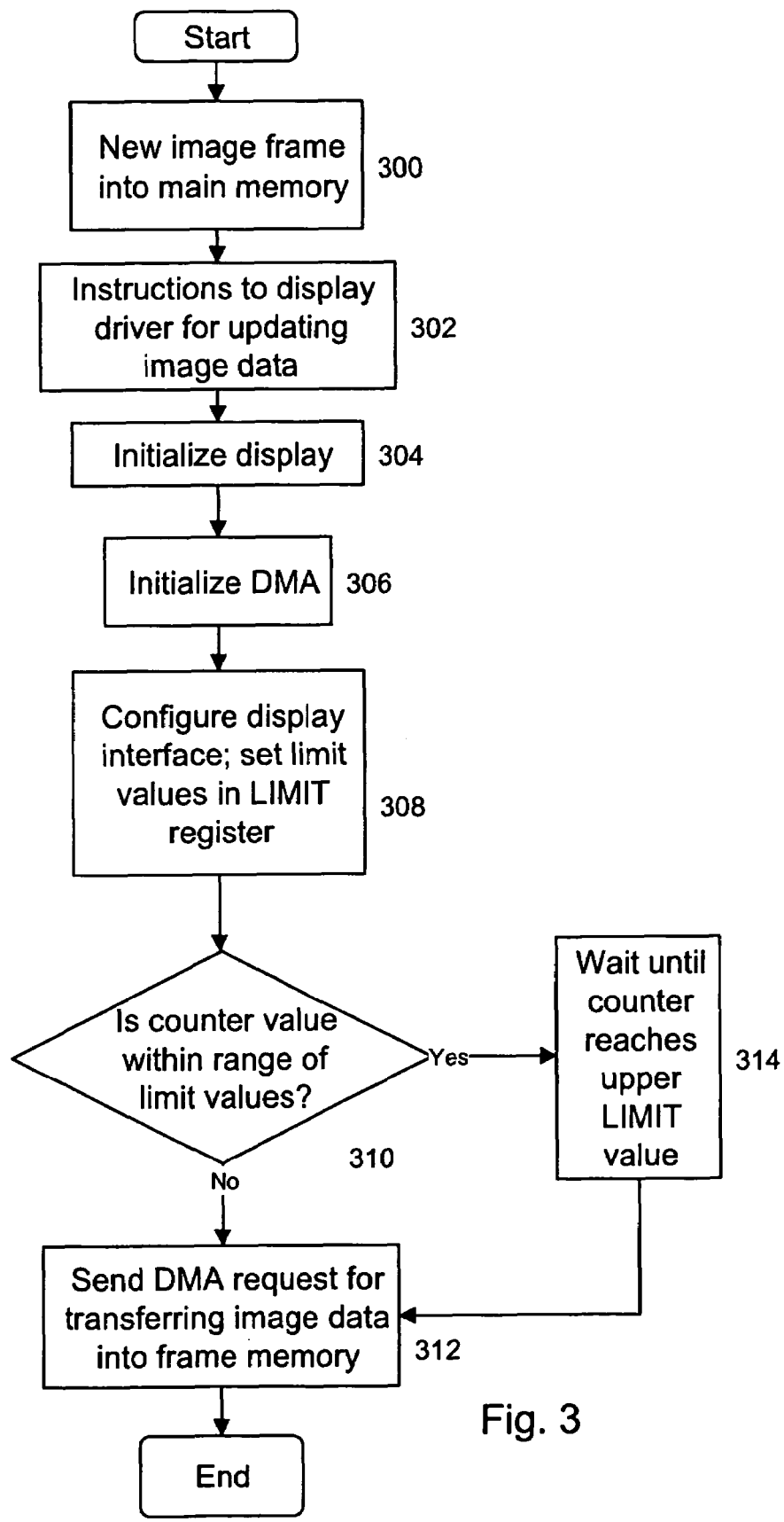
FIG. 3 is a flow diagram of a method of controlling DMA transfer according to another preferred embodiment of the invention.

This embodiment can also be illustrated by means of an example corresponding to the previous embodiment, shown by the flow diagram of FIG. 3. The assumption in this example, too, is that the display screen comprises 200 lines, the display refresh rate is double the DMA transfer rate, and new image data is to be updated to the display on lines 1 to 50. In this case, the DMA transfer cannot be started when the update of the previous image frame on the display takes place on lines 151 to 200. The image frame update to the display screen then takes place as follows: an application presenting video image generates a new image frame in the main memory 102 (step 300), whereby the master control unit MCU 106 gives instructions to the display driver 118 regarding the area of the display where image data is to be transferred (step 302), in this case on lines 1 to 50. The display driver 118 initializes the display for transfer of the next image data (step 304) and the DMA controller 110 such that the DMA controller waits for a DMA transfer request coming from the display interface before it transfers the next image data (step 306). The display driver then configures the display interface 112 and sets the value of the LIMIT register (step 308).

Here again, depending on the stage at which the update of the previous image frame proceeds on the display screen at the time when the DMA transfer of the next image data into the frame memory on lines 1 to 50 is to be started, (step 310), the following occurs:

if the request to start the DMA transfer is presented as the image data update proceeds on lines 1 to 150 of the display, the DMA control circuit 130 transmits the DMA transfer request to the DMA controller 110 immediately (step 312);

if again the request to start DMA transfer is presented as the image data update proceeds on lines 151 to 200 of the display, the DMA control circuit 130 delays the transmission of the DMA transfer request until the image data update moves to line 1 of the display, whereby the DMA transfer request can be transmitted to the DMA controller 110 (step 314).

Interruptions from the system may cause the specification of the lower and upper limits of the LIMIT values to stop or the initialization of the DMA controller 110 to be interrupted. An advantage of this embodiment is that the value of the LIMIT register is not set until after the initialization of the DMA controller 110, whereby any interruptions directed to the system after the value of the LIMIT register is set do not cause problems to the synchronization of the DMA transfer and the display update. In addition, the DMA transfer request is an internal control signal of the display system, and external interruptions do not affect the transmission of the control signal after the DMA controller is initialized for the next DMA transfer.

Information can thus be generated based on said synchronization signals regarding how the DMA transfer is to be controlled in order for a new image frame not to be input as a DMA transfer in the frame memory such that it would be stored onto the image frame to be updated to the display screen. In the above-described structure, this synchronization information is applied to the control circuit 126. In accordance with a preferred embodiment of the invention, updated information is arranged at the display interface 112 regarding the time an image frame is completely updated to the display screen 122, i.e. when the previous image frame or the area thereof that is set to be updated is visible on the display screen in its entirety. In this case, the display interface 112 can use this information to prevent DMA transfer into the frame memory in a situation when the update of image data on the display and the DMA transfer into the frame memory might bypass each other.

In practice, this can be implemented by means of a counter controlled transfer register VISIBLE_LIMIT and an interrupt signal VISIBLE_IRQ generated based thereon. The limit value of the transfer register VISIBLE_LIMIT is controlled based on the number of lines to be updated to the display at each particular time, and should be set before the value of the LIMIT register is set in the above-described manner. The display interface 112 monitors the value of the counter and, in response to the previous transfer of image data being completed, at a time when the counter value reaches the limit value VISIBLE_LIMIT, the display interface 112 generates the interrupt signal VISIBLE_IRQ, which is applied to the display driver 118. In other words, this indicates that the previous image frame or given lines of the image frame are updated to the display.

In this way, information about the display update is preferably applied from the display interface 112 to the display driver 118 without the display driver having to separately monitor the display update for instance based on counter values. It is to be noted that this information applied to the display driver 118 about the update of the previous image frame on the display screen is not essential to avoiding a tearing effect, but it provides the display system with additional information that can be utilized to avoid the transmission of image frames to the frame memory 120 too fast, whereby an entire single image frame might be bypassed in the displaying on the display screen.

Figure 4:
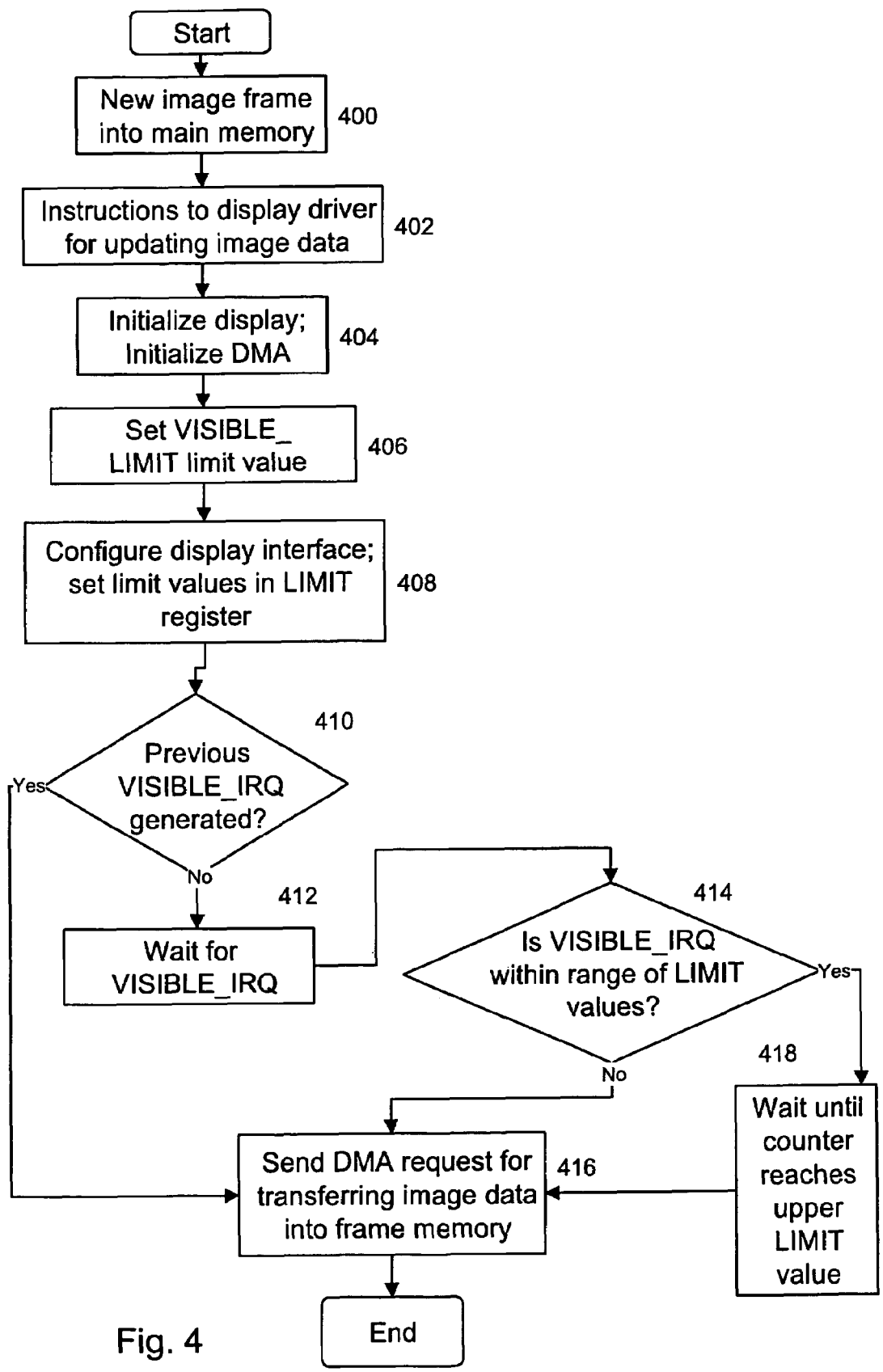
FIG. 4 is a flow diagram of a method of indicating the update of a display screen according to a preferred embodiment of the invention.

In the following, this embodiment is illustrated by the example of FIG. 4, wherein a counter controlled transfer register VISIBLE_LIMIT and an interrupt signal VISIBLE_IRQ generated based thereon are implemented in connection with the example illustrated in FIG. 3. The basis is again that the display screen comprises 200 lines, the refresh rate of the display is double the DMA transfer rate, and new image data is to be updated to the display on lines 1 to 50. In this case, the DMA transfer cannot be started when the update of the previous image frame on the display takes place on lines 151 to 200. The image frame update on the display screen then takes place as follows: an application presenting a video image generates a new image frame in the main memory 102 (step 400), whereby the master control unit MCU 106 gives instructions to the display driver 118 regarding the area of the display where image data is to be transferred (step 402), in this case on lines 1 to 50. The display driver 118 initializes the display for image data transfer on lines 1 to 50 and the DMA controller 110 such that the DMA controller waits for a DMA transfer request from the display interface before performing the transfer of the next image data (step 404).

Next, the display driver sets the limit value of the VISIBLE_LIMIT register such that it corresponds to the end point of the transfer of the image data to be updated (step 406), i.e. the end point of line 50 (last pixel on the line). This is thus the moment when the counter value is used to generate the interrupt signal VISIBLE_IRQ. The display driver then configures the display interface 112 and sets the value of the LIMIT register such that transmission of a DMA transfer request is prevented as the image data update proceeds on lines 151 to 200 on the display (step 408).

Here again, depending on the stage at which the update of the previous image frame proceeds on the display screen at the time when the application requests the DMA transfer of the next image data start into the frame memory on lines 1 to 50, the following occurs:

- a check is first made to see if the interrupt signal VISIBLE_IRQ of the previous image frame is generated at the time the request is made (step 410);
- if the interrupt signal VISIBLE_IRQ of the previous image frame is not yet generated, it is waited for (step 412), after which the moment of generation of VISIBLE_IRQ is compared with the limit values of the LIMIT register (step 414);
- if the moment of generation of VISIBLE_IRQ occurs as the image data update proceeds on lines 1 to 150 on the display, the DMA control circuit 130 transmits a DMA transfer request to the DMA controller 110 immediately (step 416);
- if again the moment of generation of VISIBLE_IRQ hits the limitation range of the LIMIT register, the DMA control circuit 130 delays the transmission of the DMA transfer request until image data update moves to line 1 on the display, whereby the DMA transfer request can be transmitted to the DMA controller 110 (step 418).

If again an observation is made above (step 410) that the interrupt signal VISIBLE_IRQ of the previous image frame has been generated, i.e. the previous image frame or a given area thereof is updated to the display, then, when the application makes a request to start DMA transfer of the next image data into the frame memory, the interrupt signal VISIBLE_IRQ does not affect the DMA transfer of image data, but it can be used for other informative purposes in the display system, such as activation of applications or other functions associated with completing the image data display update.

Accordingly, the example of FIG. 4 is associated with the above-described embodiment wherein the control block 126 is used for delaying the DMA transfer request to be transmitted to the DMA controller 110 for a time to prevent the generation of a tearing effect. The limit value of the transfer register VISIBLE_LIMIT and the interrupt signal VISIBLE_IRQ generated based thereon can also be utilized in an embodiment associated with the attenuation signal ATTN, the interrupt signal VISIBLE_IRQ being used to prevent the DMA transfer such that the moment of generation of the interrupt signal VISIBLE_IRQ is compared with the limitation value of the LIMIT register, based on which the deactivation of the attenuation signal ATTN is determined and a new DMA transfer takes place.

The above embodiments are based on the usage of the display's nominal refresh rate and its known variations as a basis for LIMIT register value calculations. However, in practical implementation there may exist several parameters, which cause the actual display refresh rate to vary from the display's nominal refresh rate, e.g. due to operating temperature variations and differences in the quality of display module hardware. These fluctuations of the display refresh rate may, in turn, result in shifts in timing of the DMA transfer, i.e. in non-synchronized DMA transfer, if the LIMIT register value calculations are purely based on the usage of the display's nominal refresh rate and its known variations. Therefore, the actual (real-time) display refresh rate should be monitored as well.

According to an embodiment, an additional hardware counter HW-CNT (denoted by 132 in FIG. 1) is included preferably in the control block for monitoring the actual display refresh rate. Furthermore, at least one, preferably two new registers REG1 (134) and REG2 (136) may also be included for holding the last measured display refresh frame rate, which is then available for immediate reading and use. The additional counter HW-CNT is preferably operated by a stable and accurate system clock signal, which is available e.g. for the MCU or an ASIC-block of the display system. The function of the additional counter HW-CNT is to count the steps according to the HW-clock signal available in the system between each incrementing step of the counter 128.

In response to the counter 128 receiving a synchronization signal from the display module, the last counter value of additional counter HW-CNT is stored in the first new register REG1, which is accessible for immediate reading and use at any time. As an example, let us now assume that the nominal display refresh rate has 30 ms timing, when operating without any disturbances, and the system clock available has 25 ns timing. This means that the additional counter HW-CNT always steps to value 1 200 000 before a new vertical synchronization signal is received and that the first new register REG1 typically holds a value of 1 200 000. After the synchronization signal occurrence and after the additional counter HW-CNT has been saved in the register REG1, the additional counter HW-CNT value is reset and the incrementation according to available system clock pulses is started again.

Then the value of the first register REG1 (expressed in pulses) is converted by a mathematical function into a value of time (expressed e.g. in milliseconds). In the above example, the value is naturally 30 ms. This time value is stored in the second new register REG2 and it can be further used to calculate the next LIMIT register values for a new tearing-free frame update. In this example, since the nominal display refresh rate is used, the value of REG2 has no effect on the calculation of the next LIMIT register values.

However, as a second example let us now assume that the internal refresh rate of the display module increases for some reason (e.g. due to change in the operating temperature). For the sake of simplicity, let us assume that the refresh rate increase happens drastically just after the synchronization signal occurrence. Now again the additional counter HW-CNT steps according to system clock pulses and ends up to a value of 800 000 before the next synchronization signal occurs. Now this value stored in the register REG1 and converted into a time value, resulting in a time value of 20 ms. Then the value of 20 ms is stored in the register REG2 and further used in the calculation of the next LIMIT register values. Thus, the change in the actual display refresh rate is immediately taken into account and the next LIMIT register values are updated accordingly.

The registers REG1 and REG2 in the above embodiment enable the calculation of the LIMIT register values in extremely precisely manner, and within all conditions of display refresh rate variations such that every single frame can be updated to the display in a synchronized and tearing-free manner.

The display system and method of updating image frames according to the invention are particularly advantageously implemented in connection with a mobile station, since a structurally simple implementation does not cause an essential change in the size and weight of the mobile station, which is an important point from the point of view of the design of the mobile station. Furthermore, signal and image frame processing in accordance with the invention does not require high processing power, which prolongs the charge of batteries.

It is obvious to a person skilled in the art that as technology advances, the basic idea of the invention can be implemented in a variety of ways. The invention and its embodiments are thus not limited to the above examples, but may vary within the claims.

What is claimed is:

1. A method of updating image frames on a display screen of a display system, the method comprising:
    transferring image data in the display system by means of a separate controller to the display screen, the display system comprising a display screen for displaying image frames, a frame memory for buffering the image frames before the image frames are transferred to the display screen, a controller functionally connected to the frame memory for incorporating a synchronization signal into the image data, a display interface for receiving the image data into the frame memory, a separate controller for inputting the image data via the display interface in the frame memory, and a display driver for controlling the operation of the display system;
    feeding back said synchronization signal to a counter from an image frame updated to the display screen;
    using a limiter register to define the moment when image frame update is prevented, in response to a request presented to the display driver to input the image frame in the frame memory; and
    comparing the current counter value with an limit value of the limiter register and controlling said separate controller to prevent the input of image frames via the display interface in the frame memory as long as the counter value is within the limits of the limit value of the limiter register.

2. A method as claimed in claim 1, further comprising
    activating, in response to specifying the limit value of the limiter register, an attenuation signal outcoming from the display driver for the moment when image frame update is prevented;
    initializing said separate controller; and
    controlling said separate controller by means of the attenuation signal to prevent input of image data via the display interface in the frame buffer as long as the attenuation signal is active.

3. A method as claimed in claim 1, further comprising
    initializing said separate controller before specifying the limit value of the limiter register such that said separate controller waits for a transfer request for transferring the image data into the frame memory; and
    controlling said separate controller by means of said transfer request such that input of the transfer request in said separate controller is prevented as long as the counter value is within the limits of the limit value of the limiter register.

4. A method as claimed in claim 1, further comprising
    setting the display driver to wait for an interrupt signal indicating that previous image data are updated;
    in response to the generated interrupt signal, comparing the moment of generation of the interrupt signal with the limit value of the limiter register; and
    in response to the moment of generation of the interrupt signal being within the limits of the limit value of the limiter register, delaying the control of said separate controller to prevent input of image frames via the display interface in the frame memory until the counter value reaches the limit value of the limiter register.

5. A method as claimed in claim 1, wherein said separate controller is a DMA controller.

6. A method as claimed in claim 1, further comprising
    buffering the image data into the buffer memory before transferring the image data into the frame memory.

7. A method as claimed in claim 1, further comprising
    controlling said limiter register, when defining the limit value of the limiter register, according to an actual refresh rate of the display screen.

8. A method as claimed in claim 7, further comprising
    defining the actual refresh rate of the display screen by a register value, which is calculated based on a system clock pulses between two vertical synchronization signals.

9. A display system, to whose display screen image frames are arranged to be updated,
    the image frames comprising a display data signal including image information and a synchronization signal controlling the update of the image information to the display, the display system comprising:

a display screen for displaying image frames;

a frame memory for buffering the image frames before the image frames are transferred to the display screen;

a controller functionally connected to the frame memory for incorporating a synchronization signal into the image data;

a display interface for receiving the image data into the frame memory;

a separate controller for inputting the image data via the display interface in the frame memory;

a display driver for controlling the operation of the display system, a feedback means for connecting said synchronization signal from an image frame updated to the display screen;

a limiter register for specifying the moment when image frame update is prevented;

a control block for controlling said separate controller, the control block comprising a control unit for generating a control signal, a register interface for setting an limit value of the limiter register, and a counter responsive to said feedback synchronization signal;

whereby, in response to a request presented to the display driver for inputting image data in the frame memory, the control block is arranged to compare the current counter value with the limit value of the limiter register and to control said separate controller to prevent input of image data via the display interface in the frame memory as long as the counter value is within the limits of the limit value of the limiter register.

10. A display system as claimed in claim 9, wherein in response to specifying the limit value of the limiter register, the display driver is arranged to activate an outcoming attenuation signal for the moment when image frame update is prevented;

the display driver is arranged to initialize said separate controller; and the control block is arranged to control said separate controller by means of the attenuation signal to prevent image data input via the display interface in the frame buffer as long as the attenuation signal is active.

11. A display system as claimed in claim 9, wherein the display driver is arranged to initialize said separate controller before the limit value of the limiter register is specified in such a manner that said separate controller waits for a transfer request for transferring the image data into the frame memory; and the control block is arranged to control said separate controller by means of said transfer request to prevent input of the transfer request in said separate controller as long as the counter value is within the limits of the limit value of the limiter register.

12. A display system as claimed in claim 9, wherein the control block is implemented as a part of the display interface.

13. A display system as claimed in claim 9, wherein the display system further comprises an hardware counter for monitoring the actual display refresh rate calculated based on a system clock pulses between two vertical synchronization signals; and at least one register for holding the last measured display refresh frame rate and for controlling said limiter register, when defining the limit value of the limiter register, according to an actual refresh rate of the display screen.

14. A mobile station comprising:

a display system comprising a display screen to which image frames are arranged to be updated, wherein the image frames comprise a display data signal including image information and a synchronization signal controlling the update of the image information to the display, the display system comprising:

a display screen for displaying image frames;

a frame memory for buffering the image frames before the image frames are transferred to the display screen;

a controller functionally connected to the frame memory for incorporating a synchronization signal into the image data;

a display interface for receiving the image data into the frame memory;

a separate controller for inputting the image data via the display interface in the frame memory;

a display driver for controlling the operation of the display system, a feedback means for connecting said synchronization signal from an image frame updated to the display screen;

a limiter register for specifying the moment when image frame update is prevented; and a control block for controlling said separate controller, the control block comprising a control unit for generating a control signal, a register interface for setting an limit value of the limiter register, and a counter responsive to said feedback synchronization signal;

whereby, in response to a request presented to the display driver for inputting image data in the frame memory, the control block is arranged to compare the current counter value with the limit value of the limiter register and to control said separate controller to prevent input of image data via the display interface in the frame memory as long as the counter value is within the limits of the limit value of the limiter register.

* * * * *